US007881969B2

(12) United States Patent
Wiseman et al.

(10) Patent No.: US 7,881,969 B2
(45) Date of Patent: Feb. 1, 2011

(54) TRUST BASED ARCHITECTURE FOR LISTING SERVICE

(75) Inventors: Garry R. Wiseman, Snoqualmie, WA (US); Kurt Weber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 11/301,402

(22) Filed: Dec. 13, 2005

(65) Prior Publication Data
US 2007/0136178 A1    Jun. 14, 2007

(51) Int. Cl.
*G06Q 30/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 6,134,548 A | 10/2000 | Gottsman et al. | |
| 6,816,850 B2 | 11/2004 | Culliss | |
| 7,409,362 B2* | 8/2008 | Calabria | 705/26 |
| 2002/0055924 A1 | 5/2002 | Liming | |
| 2004/0139049 A1 | 7/2004 | Hancock et al. | |
| 2004/0210602 A1 | 10/2004 | Hillis et al. | |
| 2004/0267691 A1 | 12/2004 | Vasudeva | |
| 2005/0004889 A1 | 1/2005 | Bailey et al. | |
| 2005/0027666 A1 | 2/2005 | Beck et al. | |
| 2005/0171955 A1* | 8/2005 | Hull et al. | 707/10 |
| 2005/0198031 A1* | 9/2005 | Pezaris et al. | 707/9 |
| 2005/0216300 A1* | 9/2005 | Appelman et al. | 705/1 |
| 2005/0256866 A1* | 11/2005 | Lu et al. | 707/5 |
| 2005/0267766 A1* | 12/2005 | Galbreath et al. | 705/1 |
| 2006/0112123 A1 | 5/2006 | Clark et al. | |
| 2006/0294134 A1* | 12/2006 | Berkhim et al. | 707/102 |
| 2008/0005064 A1* | 1/2008 | Sarukkai | 707/3 |
| 2008/0275719 A1* | 11/2008 | Davis et al. | 705/1 |

OTHER PUBLICATIONS

J Donath and D Boyd, Public displays of connection, BT Technology Journal, vol. 22, No. 4, Oct. 2004.*
"eBay-The World's Online Marketplace" http://hub.ebay.com/but last viewed Feb. 7, 2006, 2 pages.
"craigslist" http://sandiegi.craigslist.org/ last viewed Feb. 7, 2006, 1 page.
OA Dated Oct. 7, 2008 for U.S. Appl. No. 11/311,813, 29 pages.

* cited by examiner

*Primary Examiner*—Jason Dunham
(74) *Attorney, Agent, or Firm*—Shook Hardy & Bacon LLP

(57) ABSTRACT

A unique system and method that facilitates trust-based interaction within an online social marketplace is provided. The system and method involve allowing users of the marketplace to selectively interact with one another according to a trustworthiness factor. Users can be deemed trustworthy depending on which email groups they belong to with respect to one another. For example, sellers can limit who can view their listings and when based on trust levels associated with their social groups, communities, or networks. Notifications of new or modified listings can also be sent to potentially interested users based on the users' trust levels. A ratings system can be employed as well to facilitate boosting or diminishing a user's or group's trust level. The social marketplace can include such activities as a listing service to buy, sell, or give items to others, dating and other personal listings, and job searching.

16 Claims, 13 Drawing Sheets

TRUST BASED ARCHITECTURE FOR LISTING SERVICE

BACKGROUND

The World Wide Web ("Web") has evolved into an infinitely large virtual metropolis where a person can find just about anything from general information regarding people, places and things to real and commercial property offered for sale. For example, information on nearly anything and everything is offered on the Web for free or for a fee. Virtual communities are prevalent and buying and selling merchandise and services via the Internet has become a more widely accepted practice and way of doing business within the last handful of years.

Aside from established merchants and commercial retailers, individuals have found a marketplace online for shopping or peddling their new or used merchandise as well as seeking or offering a variety of services. Many employers seeking employees and those seeking employment have turned to the Internet for opportunities; and finding your future spouse or others with similar interests is a viable trend in recent years as well. Generally speaking, this marketplace can be referred to as an online classifieds listing and some websites specializing in this type of commerce currently exist. Most notably, EBay and Craig's List are two of the more popular sites.

EBay is a national site for buyers and sellers across the country. However, national sites including EBay lack the level of personalization that may be more closely associated with some of the more parochial sites such as Craig's List. EBay has traditionally focused on the ability to hold auctions across the country while Craig's List has currently adopted a message board type of framework that is purely local based. Either one may offer apparent advantages over the other, but both share at least one common problem. As with many online commerce sites, both sellers and buyers remain somewhat unsure of the other's integrity. Questions such as "Will the seller really deliver on time and will the quality be as promised?" or "Will the buyer provide payment as promised and is the buyer a real person or is this a fraud?" can often run through the minds of the respective party. Thus, there is much room for improvement regarding Internet-based commerce to make it safer and to mitigate at least some of the implicit risks of conducting business in a virtual environment.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate associating a user's social communities with an online listing service such as when buying or selling items via the Web. The systems and methods take advantage of a user's circles of trust to provide a more trustworthy marketplace for buying, selling, dating, or job searching. The outer circles may signify less personal familiarity with the user whereas the inner circles may afford an implicit trust association based in part on belonging to a particular community. By employing a user's social networks to assist the user in determining the trustworthiness of the other party when buying or selling an item or looking for a date online, the perceived risks associated with such activity may be lowered.

A user may have multiple circles of trust or communities that he/she may belong to such as for coworkers, friends, family, club membership, church group, and/or friends of friends. As the circles extend further from the user, the trust value may decrease by some amount. This notion of trust can assist both buyers and sellers. For example, imagine that a buyer, Paul, initially searches through items offered for sale by his fantasy football friends (e.g., one of his social communities). Sellers in that community may offer a discount to Paul (and to other community members) or some other benefit such as free shipping or delivery. Paul can also search through his friends' contacts and/or various other communities that he/she may belong to before searching the general public's listings for the desired item. In doing so, Paul may feel more at ease and less at risk for receiving bad merchandise, an unfair price or a late delivery of the goods.

In addition, sellers in Paul's communities can selectively notify him and other members of new or recently updated listings. Notification can be in form of an instant message, email message, chat message, blog, etc., depending on the type of communication service shared by the seller and the selected members of his/her communities. Thus, security threats such as spam and phishing messages can be mitigated for the benefit of both buyers and sellers.

Users of this trust-based listing service can also rate one another. The ratings can refer to a point scale system based on user feedback and can affect whether a user retains or loses his/her access and use of the listing service. For example, a buyer or seller with low or very low ratings (or a rating below a minimum threshold) may be temporarily suspended or permanently removed from the listing service. This is because the relative trust level of low or very low rated users has been diminished by their poor ratings. Social groups can be rated as well. Thus, any member who brings the group's rating down may be suspended or removed from the group to mitigate any adverse treatment of the group as a whole.

More specifically, a seller's ratings can affect whether a potential buyer will consider the seller's listings. Similarly, the number, variety, or type of listings exposed to a low-rated buyer may be limited. For instance, a seller can choose to mask his/her listings to all users or to all members of his/her communities that have a rating below y. Buyers can also select a seller based in part on the seller's rating. Presumably, high rated sellers can be deemed even more trustworthy and thus may see more traffic to their listings. In other scenarios such as job searching or dating, the listing party's ratings can affect those who inquire about the person or about the job opportunity.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

Figure 6:
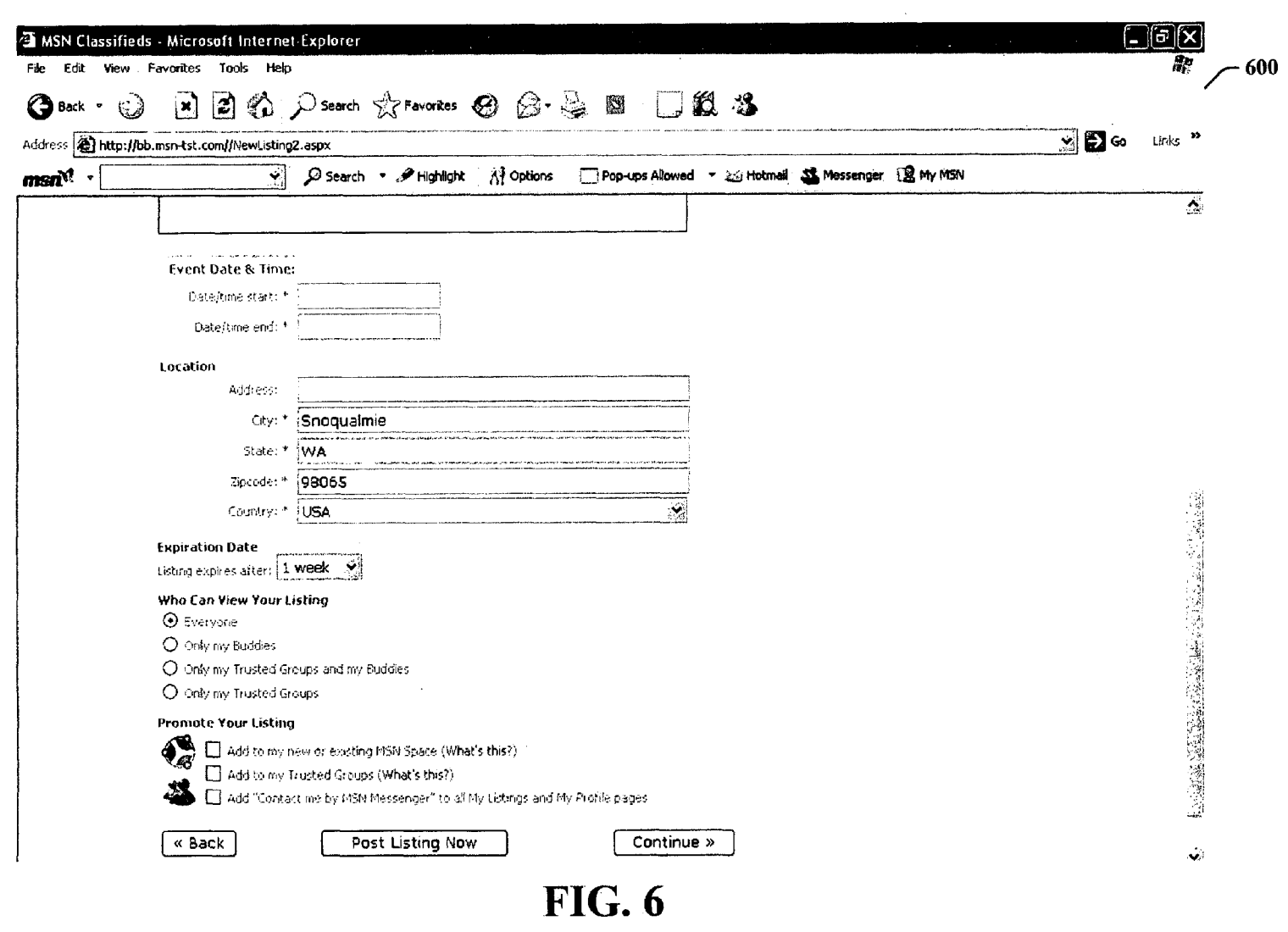

FIG. 6 is an exemplary user interface of a set-up screen for any new listing that a user of the listing service may like to post in order to announce, sell, or offer the listed item to others.

FIG. 7 is an exemplary user interface of a search view screen that allows a user (e.g., buyer or seller) to designate which communities (e.g., messenger buddies only) and email groups (tribes) to search based on trust associated with that community or group.

FIG. 8 is a block diagram of a search view screen that allows a user (e.g., buyer or seller) to designate which listing communities (e.g., email tribes only) to search for listings based on trust associated with that community or group.

FIG. 9 is a block diagram a search view screen that allows a user (e.g., buyer or seller) to designate which communities (e.g., email tribes and messenger buddies) to search (for listings) based on trust associated with that community or group.

DETAILED DESCRIPTION

Figure 1:
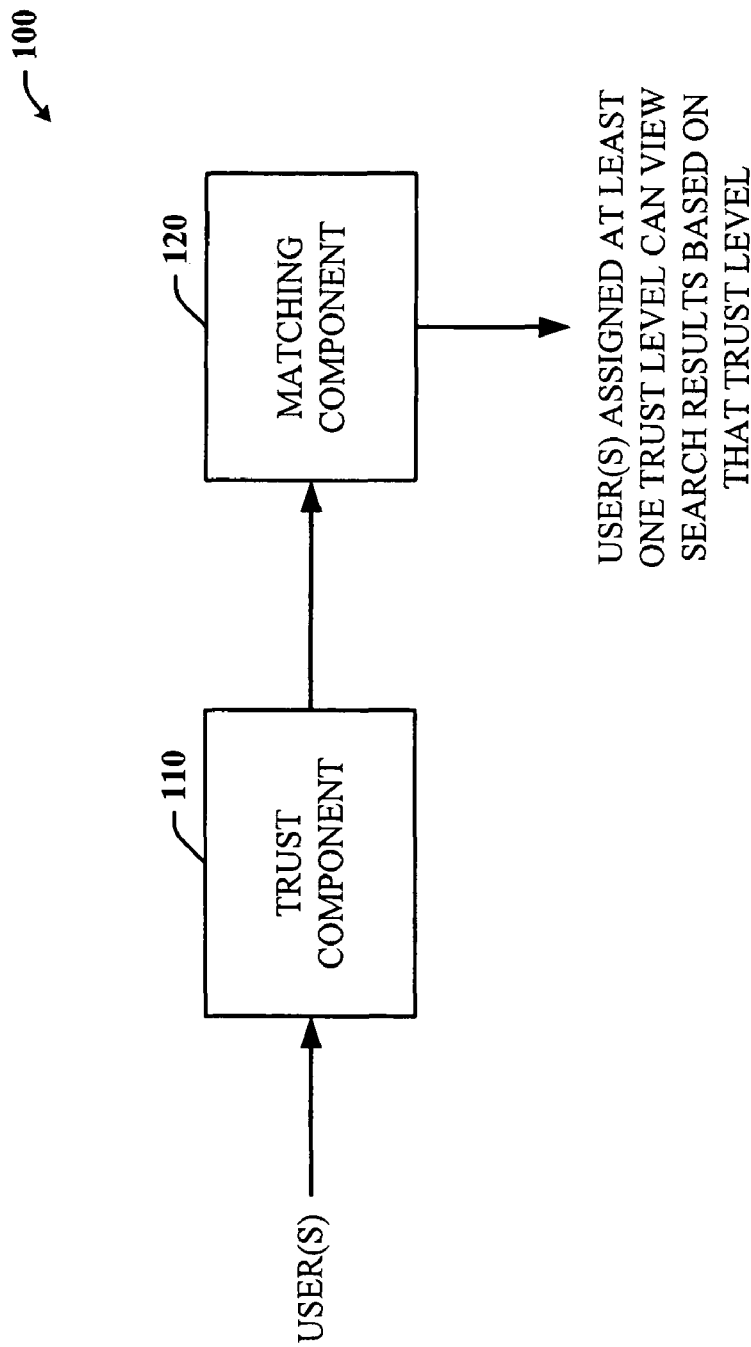
FIG. 1 is a block diagram of a trust-based listing service system that facilitates transactions or any exchange of information between and among users.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with assigning a trust level or association with one or more users or a group/community of users in an automated manner based on a user's historical trust determinations. This can be particularly useful when multiple contacts are added to a user's social network. For example, imagine that Nancy has manually assigned various social networks or communities to which she belongs different trust levels. Next, suppose that Nancy has added a plurality of new people including some friends, work colleagues, and/or family members to her contact list and when any of these people employ the listing service, Nancy would presumably like to view or otherwise interact with their listings and vice versa. To make the addition of new people to Nancy's social network more seamless and effortless for Nancy and her "contacts", the system and/or method can automatically suggest or assign trust levels to these people. Such suggested assignments or actual assignments of trust can be determined based at least in part on the user's (e.g., Nancy) previous assignments and preferences.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Unlike conventional online marketplaces, the systems and methods described below in FIGS. 1-12 provide for a social marketplace environment that takes advantage of a user's social groups, networks, communities, and/or connections to facilitate the marketplace experience for the benefit of all parties (e.g., listing owner, listing viewer, etc.). Whether buying or selling a good or service, looking for new friends, a date, an employee, or an employer, the social marketplace creates more trusted filtered views of the items posted on the listing service. Furthermore, the social marketplace can leverage off of existing communication systems such as instant messaging and email systems to optimize more efficient communication between users and to mitigate the undesirable exposure of a user's contact information (e.g., email address, wireless phone number, etc.).

Referring now to FIG. 1, there is a general block diagram of a trust-based system 100 for a listing service that mitigates implicit risks associated with exchanging information online or buying and selling among individuals in an online marketplace. The system 100 includes a trust component 110 that categorizes, determines, and/or assigns a trust level to one or more users based on the one or more users' associations with one or more communities. This information can be communicated to a matching component 120. The matching component 120 can selectively expose and/or mask the at least one user from other users and/or their listings based on the users' trust levels.

The trust level of each user facilitates determining what content is displayed or hidden from them. For example, imagine that Mary and Matthew are instant messaging friends. Mary also sells custom designed lamps online via a listing service. Matthew is also a user of the listing service and frequently searches and shops for items. In order for Matthew to view Mary's listings, Mary assigns a trust level to Matthew via the trust component 110 that allows him to see her listings. Otherwise, when Matthew performs a search for lamps, for instance, Mary's listings will be masked from Matthew and the search results will not include any of Mary's listings. Thus, sellers can selectively choose to whom to sell their items. Some sellers may still opt to allow everyone and anyone from the general public to view their listings and to sell their items to them as well. This trust-based system also mitigates some risks for buyers since they can also selectively choose to deal with only trusted sellers they know and/or with any seller regardless of whether they know him/her.

Trust levels can be assigned or designated according to the users' relationship with one another. For instant, if Mary and Matthew worked for the same company but do not know each other personally, Mary's trust level for Matthew may be lower than if Matthew were also a personal friend but higher than if Matthew did not work for the same company. Hence, some level of trust exists between Mary and Matthew in this scenario because there is some connection or relationship between them.

Many different frameworks may be possible to establish or create the trust-based listing service. One approach to this framework involves a user's circles of trust whereby each concentric circle indicates a different relationship with those included therein, and thus perhaps a different trust is shared between the user and those in that particular circle. Presumably, the outer circles are further from the user and thus the amount of trust between the user and the circle's occupants is lower. Conversely, the inner circles bear a closer relationship with the user and hence are deemed to be more trusted by the user.

A rating system can also be employed to further boost or diminish a person's or group's trust which can either promote the user and/or the group as a whole to a higher trust level or demote the user and/or the group as a whole to a lower trust level. For example, buyers and sellers can provide feedback regarding their buying or selling experiences with one another and this feedback can be employed to determine the buyers or sellers overall rating. When job searching, employers can also be rated by those who have applied for or worked with the employer.

Moreover, a trust-based online marketplace can be created based in part on a user's social groups or communities particularly with respect to buying and selling items, dating, or job searching. This is because a user's social networks usually have a greater amount of trust associated with them when compared to the general public.

Figure 2:
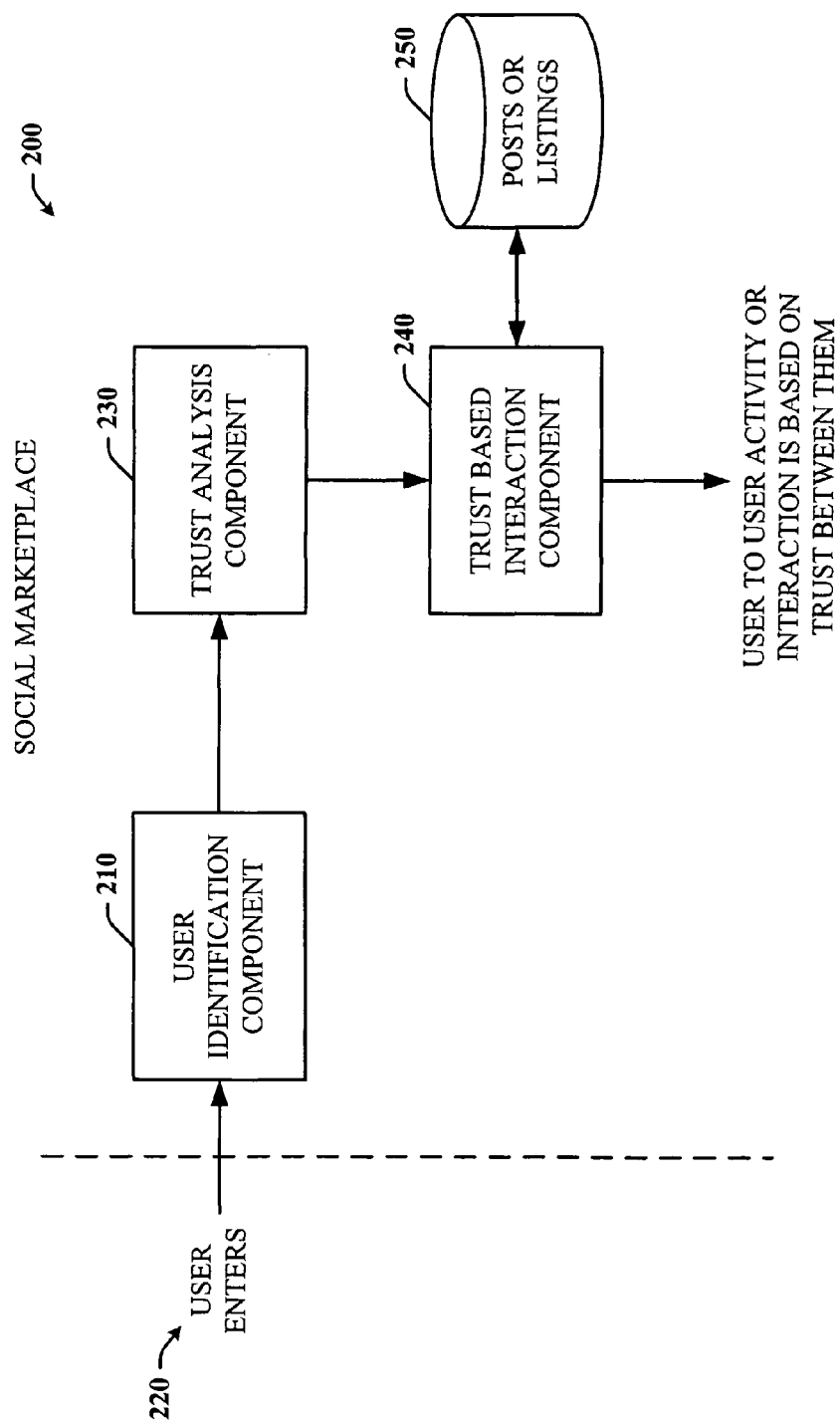
FIG. 2 is a block diagram of a trust-based listing service system that selectively exposes or masks listings based on a trust factor to facilitate the exchange of information between and among users.

Referring now to FIG. 2, there is a block diagram of a trust-based system 200 for a listing service that facilitates interactions between trusted users. The system 200 includes a user identification component 210 that identifies a user 220 when the user 220 enters the marketplace (e.g., login data). The user 220 may be a buyer, seller, job seeker, or other individual interested in browsing or posting a listing to the marketplace. The user identification component 210 finds any information regarding the user such as an available user profile and communicates this information to a trust analysis component 230.

The trust analysis component 230 can examine the user profile and any other data associated with the user 210 to determine the user's 220 trust level(s). Assuming that at least one trust level exists between the user 220 and other users of the marketplace, a trust-based interaction component 240 can be activated to facilitate user-to-user interaction in accordance with the user's 220 trustworthiness (e.g., trust level). In particular, the trust-based interaction component 240 can determine what listings 250 or listing information the user 220 is privy to based on the user's 220 trust level. For example, the user's 220 trust level may provide him access to buy from selected sellers or view selected listings or receive notifications regarding selected listings.

In practice for instance, members of an email group for cross-country skiers can be assigned a trust level that allows each of them to buy and sell freely among each other or otherwise view each other's listings. Thus, Shane who is a member of the group can search through listings posted by any member of this group. Alternatively or in addition, Shane can enter a query for ski poles and choose to only view listings that have been posted by his trusted contacts including the cross-country skiers email group and/or any other contacts that have the desired trust level associated therewith. His other contacts may include friends, friends of friends, relatives, friends of relatives, coworkers, fellow students, etc.

Figure 3:
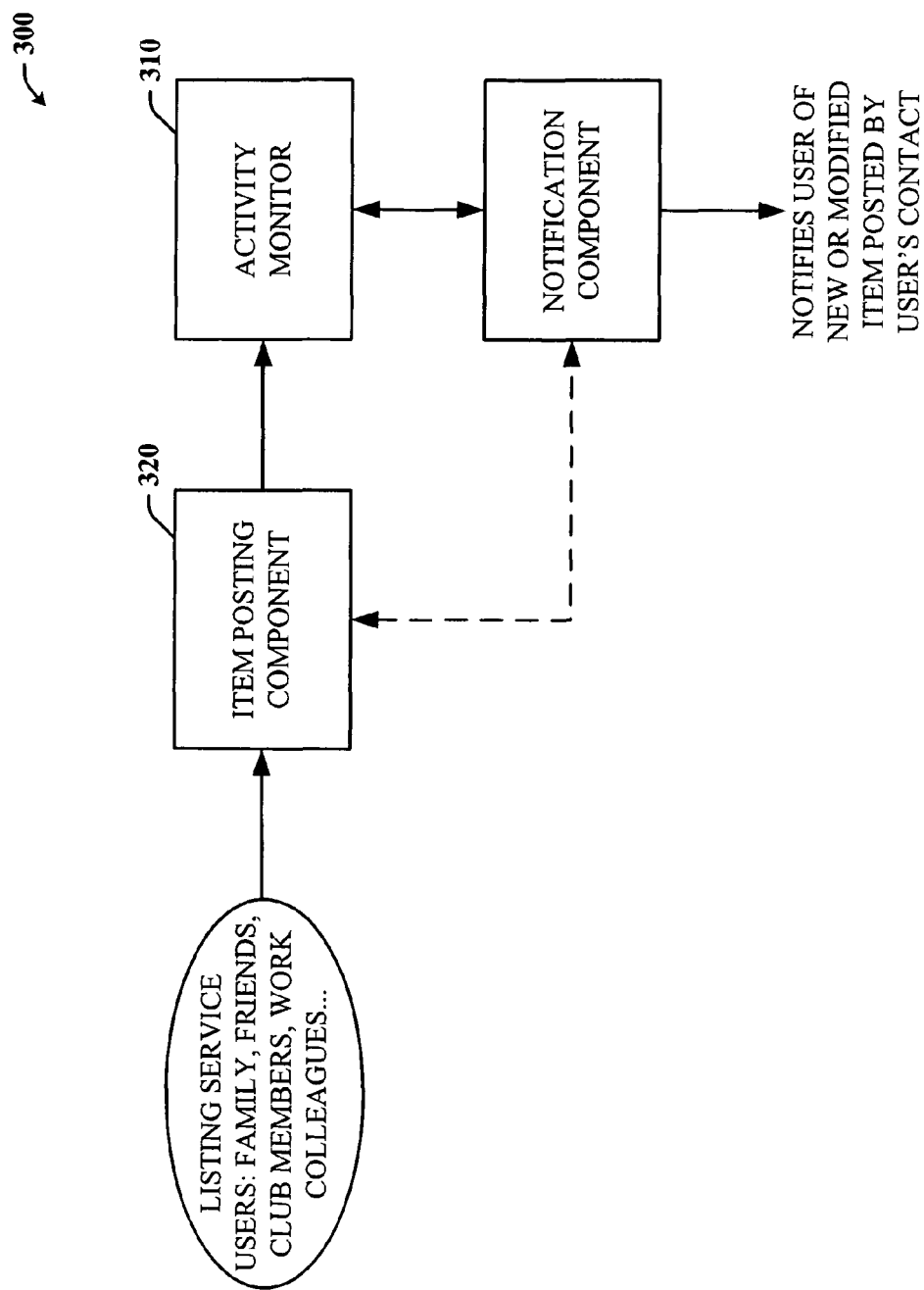
FIG. 3 is a block diagram of a trust-based listing service system that monitors postings or listings and notifies designated users of such new or updated listings according to a trust factor or indicator of such users.

Turning now to FIG. 3, there is a block diagram of a trust-based system 300 for a listing service that facilitates the promotion and/or advertisement of listings by distributing notifications to potential buyers, for example, based at least in part on their trust association with the posting party (e.g., listing owner). The system 300 includes an activity monitor 310 that can monitor user activity with respect to posting or updating listings. Listings can be posted or updated by users of the listing service via an item posting component 320. A user can indicate which users or groups of users to monitor for new or updated listings. When a specified user is detected by the activity monitor 310, a notification component 330 can notify one or more other users of the new or modified listing. A notification can be sent by the communication means shared or employed by the posting party and interested user. For example, suppose that a first and second user typically communicate by email using a particular messaging service. The first user has just posted a new listing using the listing service. When such activity by the first user is detected, the second user can be notified via email using the particular messaging service. If the second user is interested in the listing, he can readily send an email to the first user.

If, in addition to email, the first and second users also communicate by instant messaging and the first user appears to be "online", then the second user can send an instant message to the first user. Otherwise, the second user can send the email message. Thus, there are many different ways for such users to communicate with one another using known and familiar communication systems, thereby minimizing the amount of phishing and spam messages that any user may receive. Unfortunately, some conventional listing services employ anonymous messaging systems which can result in or contribute to the phishing and spam messages that a user may not otherwise receive.

The notification can come in many different forms or formats. For instance, the notification can be in the form of a text message, voice message, or an icon or symbol that is placed next to the (first user's) name as shown in the second user's address or contact list. The content of the notification can include a brief message stating that the first user has recently posted a new or modified listing and include a link to the full listing. An abbreviated version or summary of the listing can also be included in the notification instead along with the link to the full listing.

As an alternative to monitoring user activity for new or modified listings, the posting party can also designate which users to notify based on the users' trust association therewith. For instance, when setting up an account for the listing service or when posting individual items, a user can opt to notify others of his/her new or updated listing. Imagine that as soon as James adds a new listing for his hand-carved serving platters, users having a particular trust level and/or belonging to any of James's trusted groups may receive a notification or advertisement for James's new listing.

Figure 4:
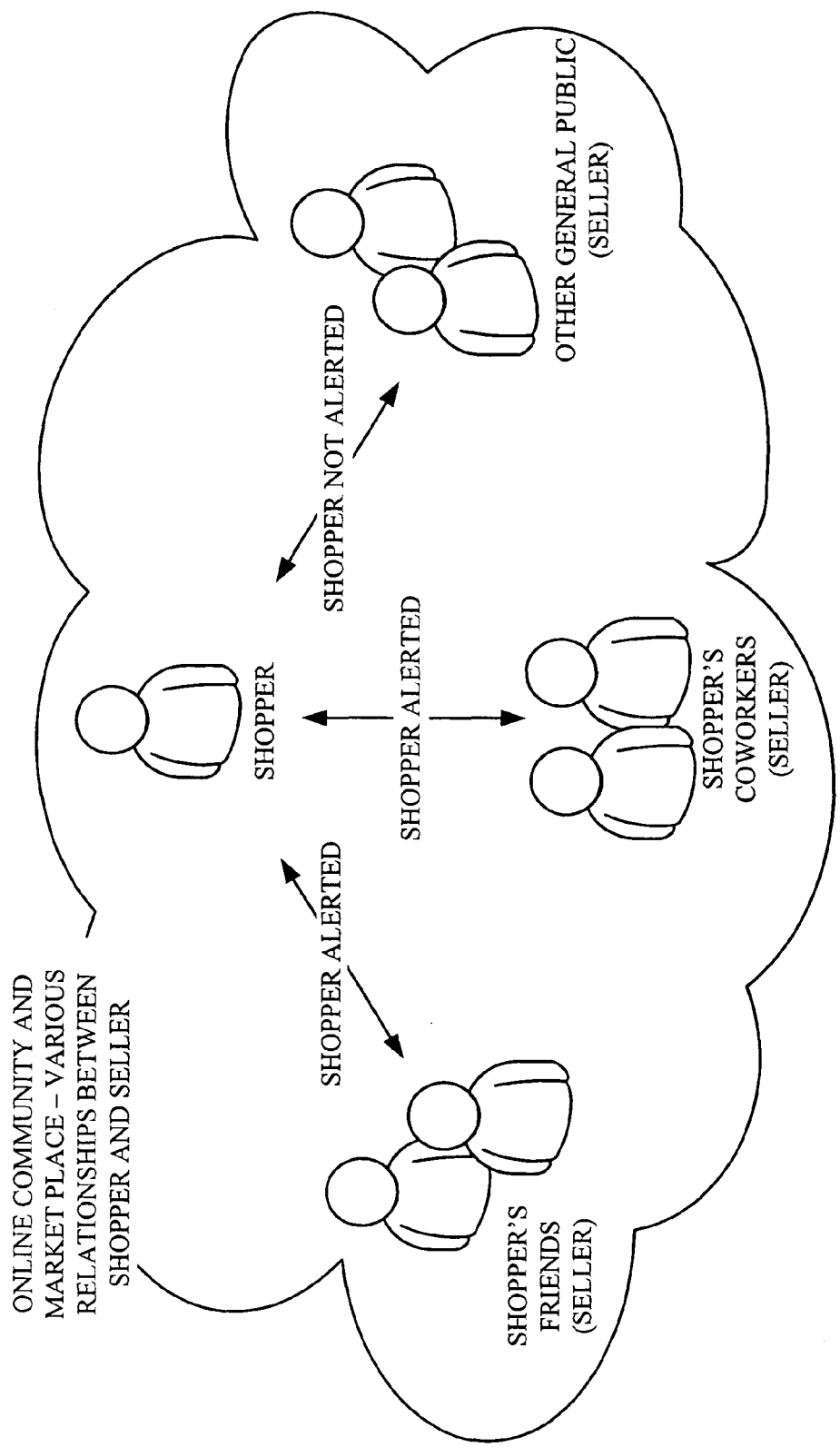
FIG. 4 is a block diagram that demonstrates a notification aspect of the trust-based listing service as it relates to the various relationships that may exist between users in an online marketplace.

FIG. 4 further demonstrates this notification aspect of the trust-based listing service as it based on the various relationships that may exist between users in an online social marketplace. For example, a shopper may be notified of his/her friends' and/or coworkers' new listings. However, he/she may not always be notified of other listings posted by the general public (e.g., users who are not within any of the shopper's trusted groups or communities). Receipt of a notification can also depend on the shopper's previous history with the seller (e.g., posting party), in addition to a requisite level of trust. For example, the seller may only want to notify trusted users who previously showed interest or purchased the same or similar item. In a dating scenario, a user may only want to "announce" their new or updated listing to other trusted users who have previously shown an interest in the same or similar type of person.

Figure 5:
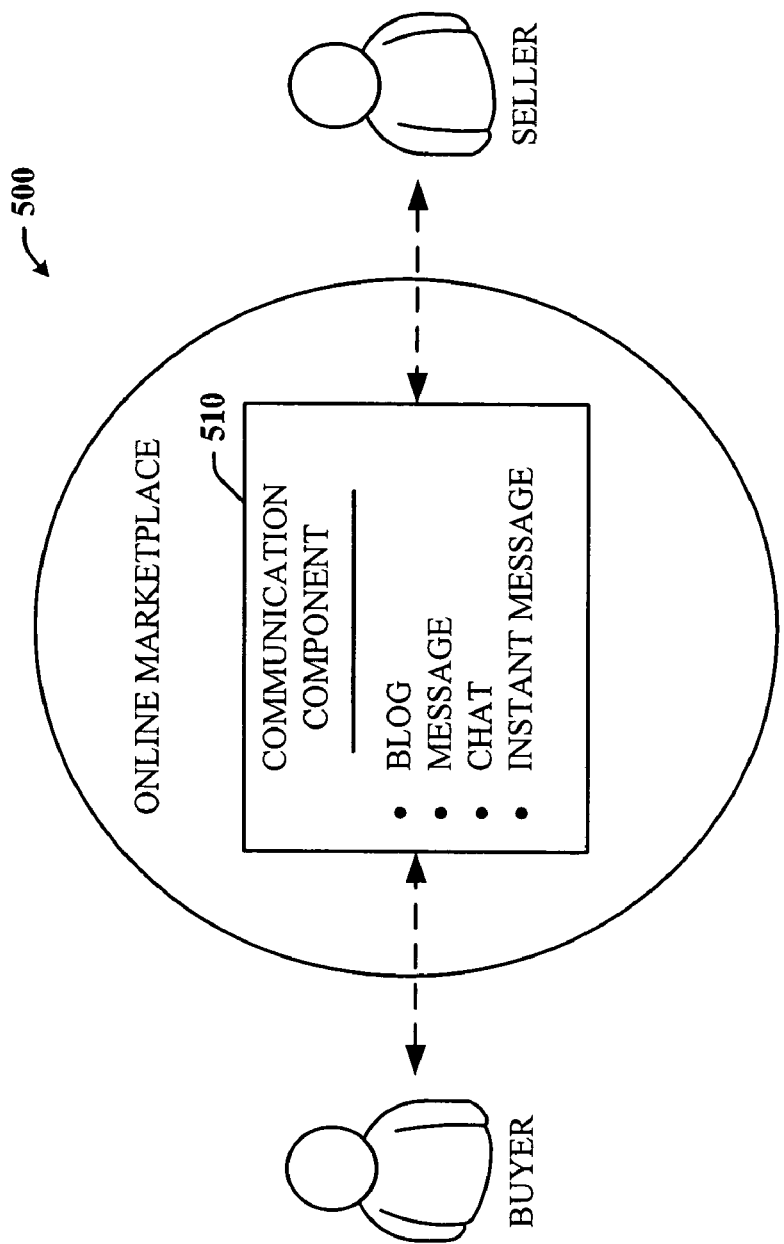
FIG. 5 is a block diagram that demonstrates the various ways a buyer and seller can communicate with ease according to their shared or common communication systems which mitigates or lessens receipt of spam and phishing messages.

Moving on to FIG. 5, there is a block diagram 500 that demonstrates the various ways a buyer and seller, for instance, can communicate with ease according to their shared or common communication systems 510. By employing at least one shared communication system, amounts of spam and phishing messages received by the user can be reduced if not minimized. The trust-based listing service can recognize the modes of communication that are available or used by the parties and make them available for communicating about items or services offered through the listing service. When more than one mode of communication is commonly used between at least any two parties, the system or the users can decide which service to utilize. If network traffic becomes an issue, the system can determine the most efficient communication means that would facilitate a possible transaction between the users (buyer and seller). For example, suppose that the buyer and the seller frequently use text messaging on their smart phones to communicate with each other. The notification component within the listing service can then send an alert via text messaging to the buyer's smart phone.

The next few figures represent various display screens that a trust-based listing service may utilize to facilitate exchanges between users in an online social marketplace. Beginning with FIG. 6, there is an exemplary user interface 600 of a set-up screen for any new listing that a user may like to post. As can be seen from the figure, various options are made available to the users. For example, the user can select who may view the listing and the duration of the listing. In addition, the user can select if and how to promote their listing in order to increase traffic to the listing.

Figure 7:
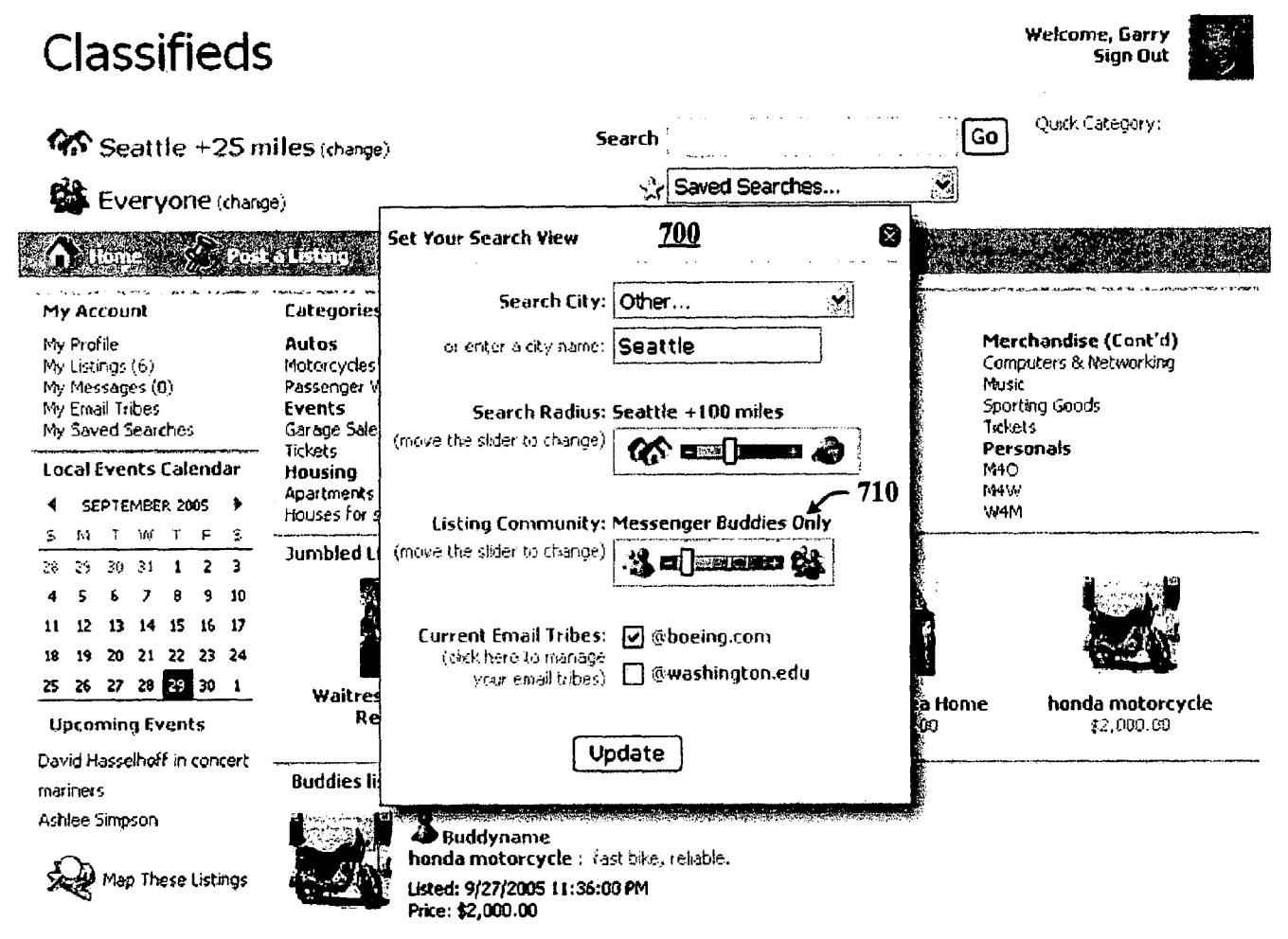

FIG. 7 illustrates an exemplary user interface of a search view screen 700 that allows a user (e.g., buyer or seller) to designate which communities and/or email groups (tribes) to search based on the trust associated with that community or group. In this sample scenario, a user can make use of a slider control 710 to select which group of users can view the listing or which listings to view. At either end of the slider, symbols or icons can be included to signify the range of the slider. Here, the slider control 710 has been positioned all the way to the left end which indicates that only the user's messenger buddies can access or otherwise view the user's listings.

Figure 8:
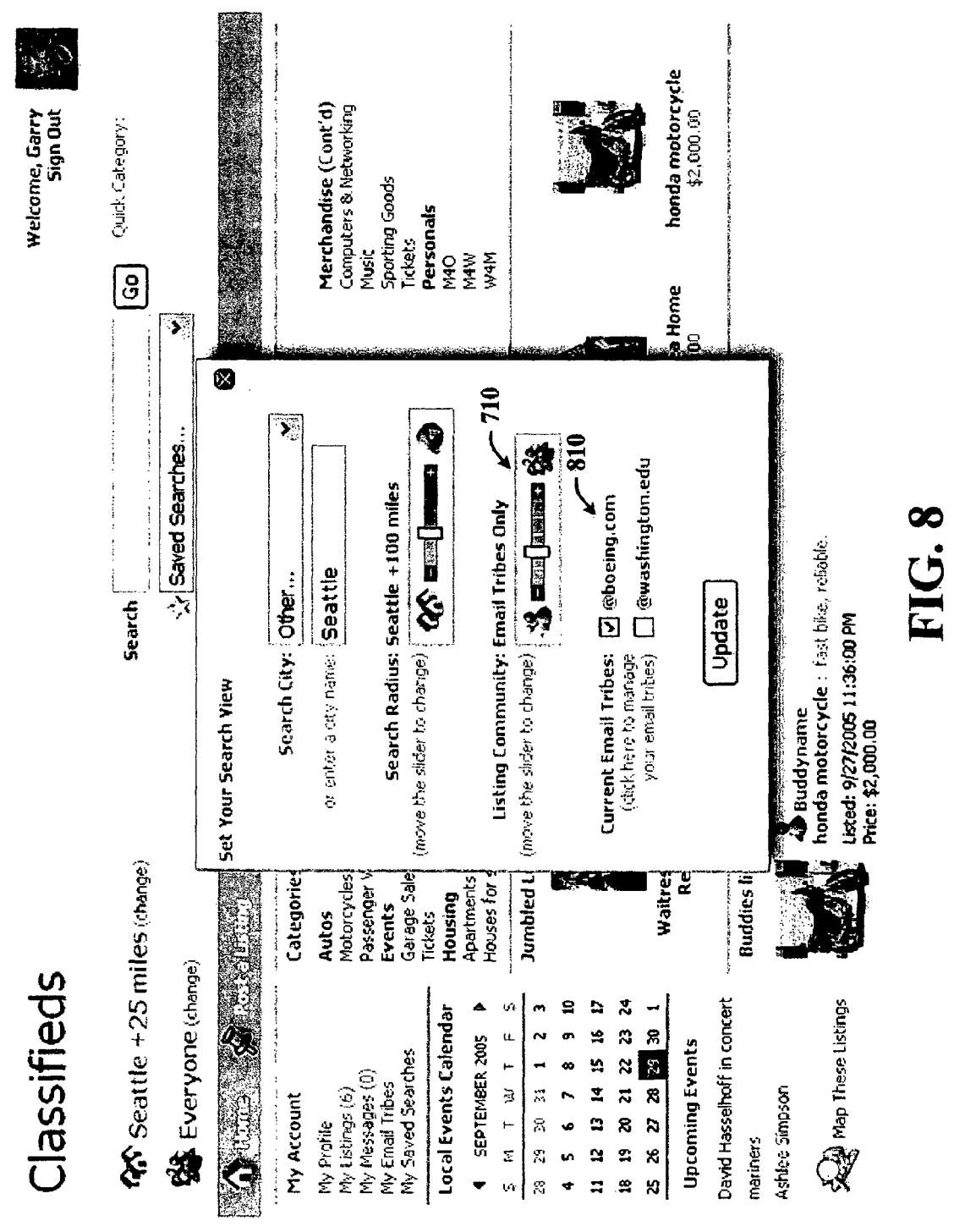
Figure 9:
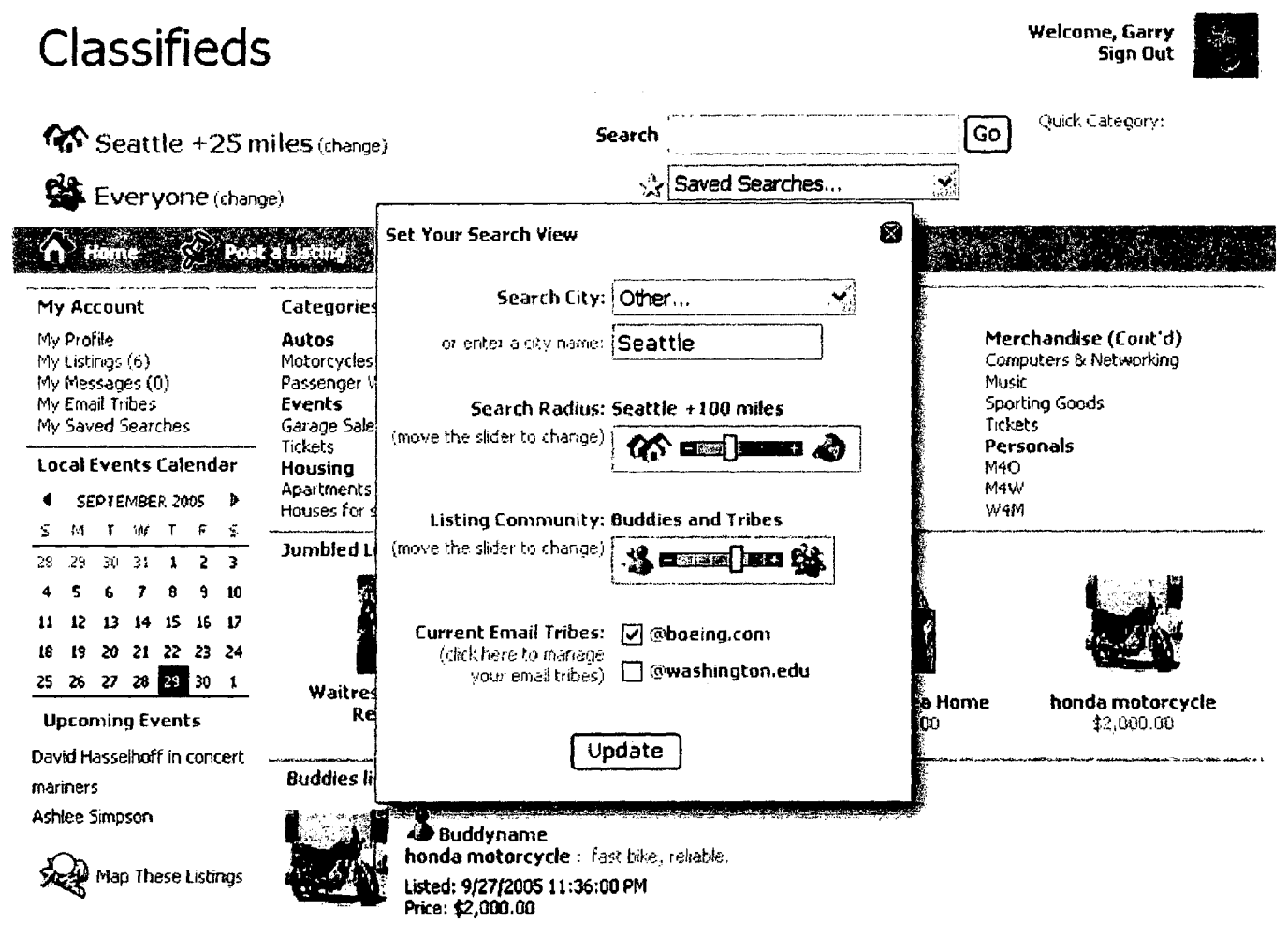

In FIG. 8, the position of the slider 710 has been moved toward the right which now indicates that the listing community is limited to the user's email tribes. Below the slider control is a list of the user's current email tribes 810. The user can select one or more email tribes as desired. Finally, in FIG. 9, the user can position the slider 710 further toward the right which expands the listing community to both buddies and tribes. Here again, the user can select which email tribes 810 to include or exclude from the listing community.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 10:
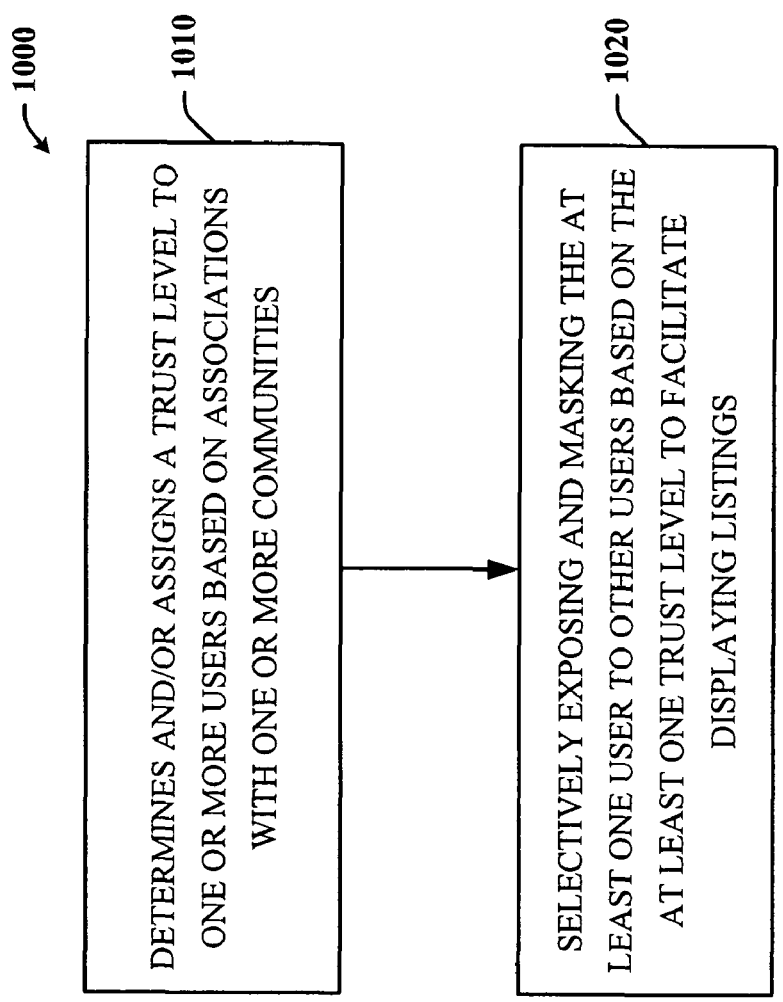
FIG. 10 is a flow diagram illustrating an exemplary methodology that facilitates transactions or any exchange of information between and among users such as buying or selling goods and services or viewing and responding to personal listings.

Referring now to FIG. 10, there is a flow diagram illustrating an exemplary method 1000 that facilitates exchanging information between and among users such as buying or selling goods and services or viewing and responding to personal listings. The method 1000 involves determining and/or assigning a trust level to one or more users based on the user's (or users') associations with one or more communities at 1010. At 1020, listings can be selectively exposed or masked from the one or more users based at least in part on their trust levels. In practice, for example, imagine that a user has entered a query to look for antique door knobs. The search results returned to the user may be chosen based on the user's trust level relative to the trust level associated with the listings. That is, if the user's trust level is 5 on a scale of 1-10, where 10 is the highest trust level and 1 is the lowest (e.g., general public), then the user may see all listings which have been designated with a trust level of 5 of lower (e.g., 4, 3, 2, and 1). Put another way, the listing owners can require that a user have a certain trust level to view their listing. An optional listing setting may allow the listing owners to select "a minimum trust level of h" or "an exact trust level of h".

Alternatively, the listing owners may designate trusted groups (e.g., email tribes) or trusted individuals rather than a trust value with respect to their listings. For example, a listing may only be exposed to members of the "@abcschool.edu" email tribe. Thus, when a user enters a search, the listing service or some component thereof can analyze the user's profile to determine the user's tribe and/or community memberships. If there is a match between the listing's requirements and the user's profile, then the relevant listings can be exposed and displayed to the user. Otherwise, the listing is masked from or not displayed to the user.

Figure 11:
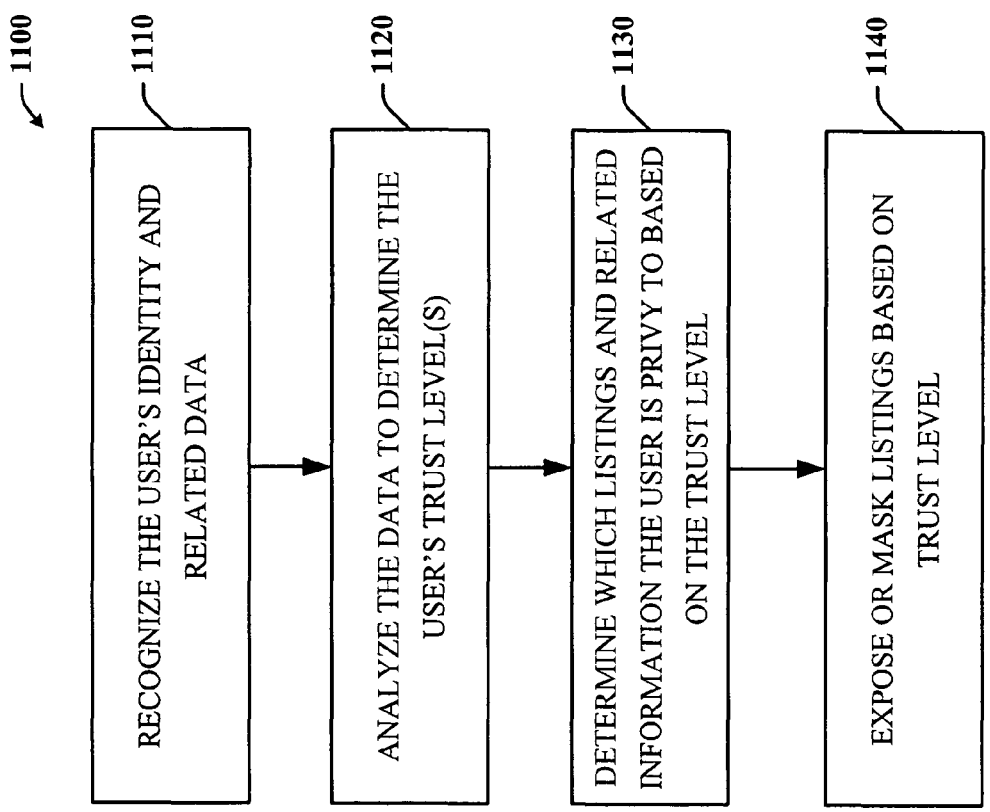
FIG. 11 is a flow diagram illustrating an exemplary methodology that facilitates communication between users based on their trust levels in connection with a listing service that can be employed for buying and selling goods, job searching, and dating.

Referring now to FIG. 11, there is a flow diagram illustrating an exemplary method 1100 that facilitates communication between users based on their trust levels in connection with a listing service that can be employed for buying and selling goods, job searching, and dating. The method 1100 involves receiving a user's identity information and/or related data (e.g., login data) at 1110 and analyzing such data at 1120 to determine the user's trust level(s). At 1130, the method 1100 can determine which listings and related information the user is privy to based on the user's trust level(s). At 1140, the method 1140 can selectively expose or mask one or more listings based on the trust level(s). In practice, for instance, the listings can be selectively exposed or masked during a listing retrieval process in response to a user's search request. The search request may be for a specific item or may be for any listings posted by specific groups, communities, and/or individuals.

Figure 12:
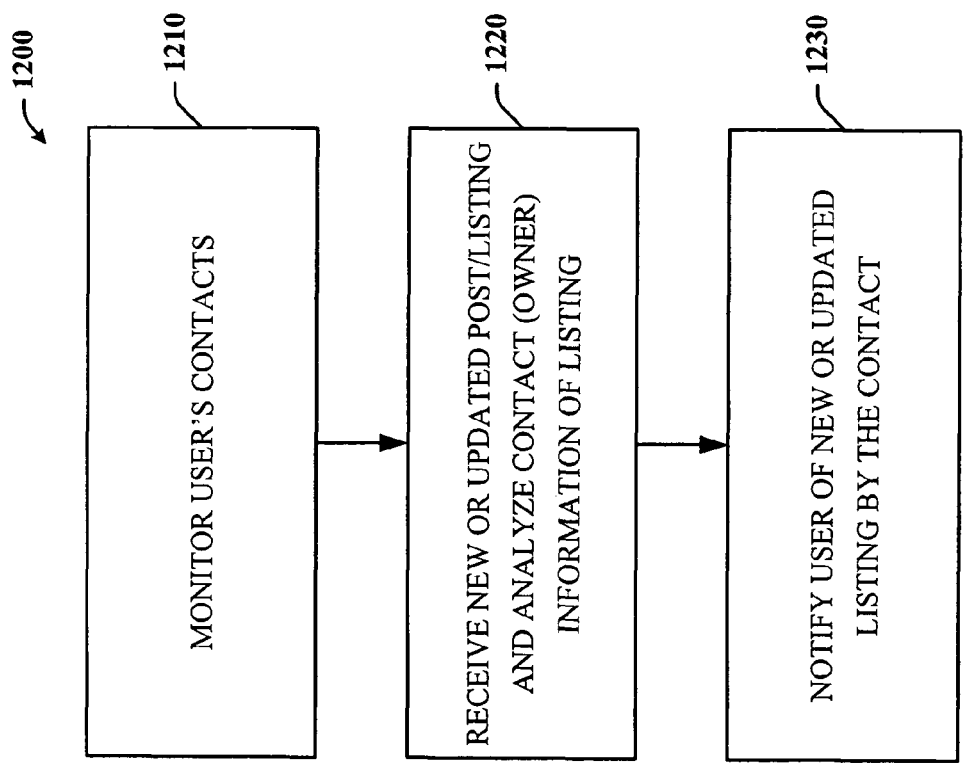
FIG. 12 is a flow diagram illustrating an exemplary methodology that facilitates notifying one or more users of at least one other user's listing according to the trust level of the (receiving) users.

As described in FIG. 12, a user can request notification of when trusted sellers, for example, have posted new listings. In addition, sellers can notify others of their new listings first before making it available to the general public. The flow diagram in FIG. 12 illustrates an exemplary method 1200 that facilitates notifying users of new or updated listings based on the users' trust levels. The method 1200 involves monitoring a user's contacts and their posting activities at 1210. Such contacts can include but is not limited to the user's friends, relatives, colleagues, friends of friends, school mates, etc. which are listed in the user's address directory or contact list. When a listing has been modified or newly submitted, the listing can be analyzed to determine its owner at 1220. If there is a match between the listing owner and the user, then the user can receive an alert or notification about the new or modified listing (at 1230). Alternatively, the listing owner can specify to send or distribute the new or modified listing to a particular listing community or to any community or individual having a particular trust level or at least a minimum trust level.

Figure 13:
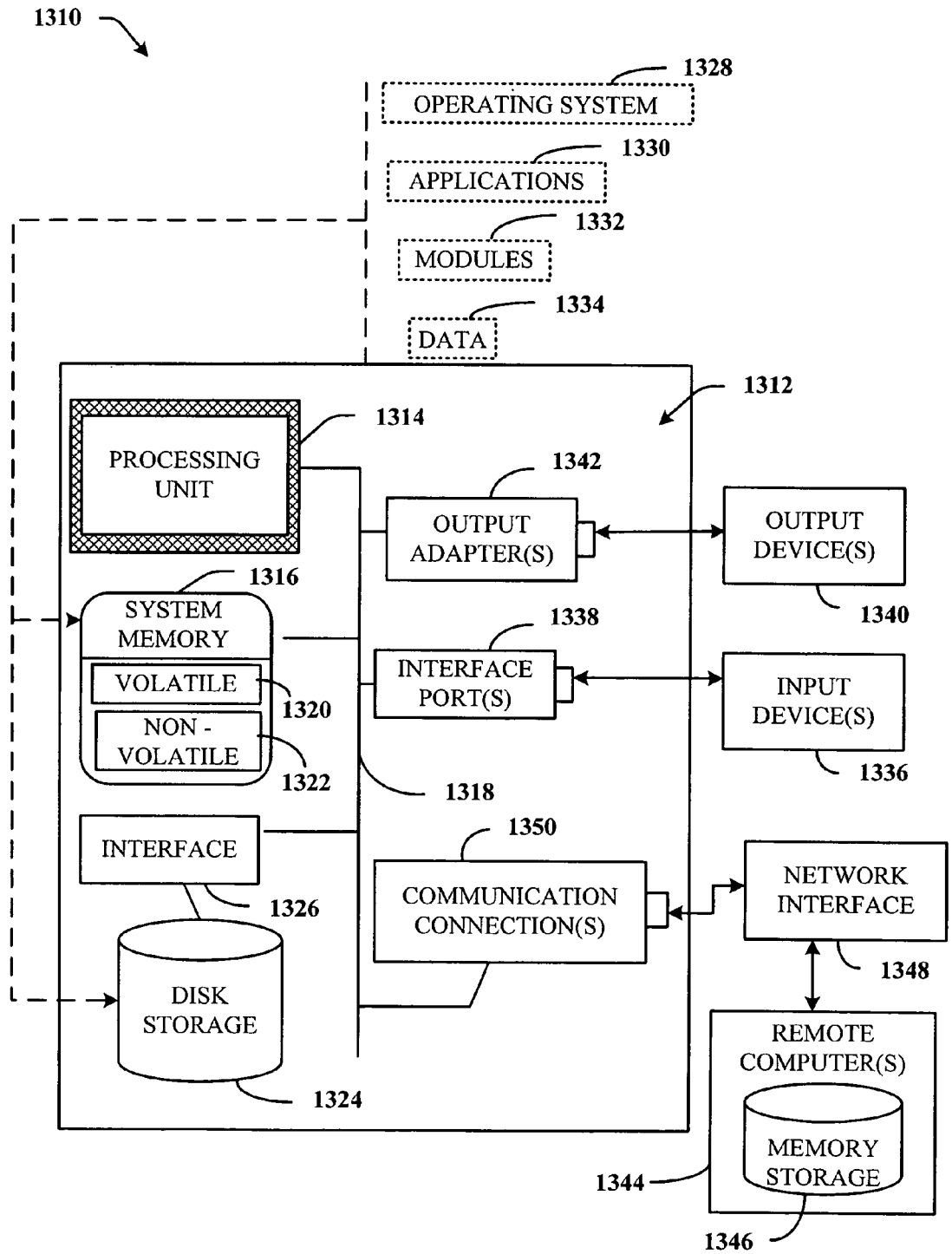
FIG. 13 illustrates an exemplary environment for implementing various aspects of the invention.

In order to provide additional context for various aspects of the subject application, FIG. 13 and the following discussion are intended to provide a brief, general description of a suitable operating environment 1310 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the system and/or method includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject system and/or method can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A trust-based system embodied on one or more computer-readable storage media having computer executable instructions embodied thereon for interacting with a listing service, the trust-based system comprising:
   a trust component that determines at least one trust level for a first user of a listing service based on:
   at least one association of the first user of the listing service with one or more communities of users, each particular community of users possessing a distinct trust level associated with that particular community, wherein distinct trust levels are determined based on ratings assigned to each user of the listing service based on interactions within the listing service, and
   an association of the first user of the listing service with a second user of the listing service;
   a matching component that selectively only exposes the first user of the listing service to one or more classified listings of the second user of the listing service responsive to the trust level of the first user of the listing service in association with the second user of the listing service meeting a threshold level of trust set by the second user of the listing service; and
   a rating system that rates the first user of the listing service based at least in part on feedback received from other users of the listing service, wherein at least one trust level of the first user of the listing service is boosted or diminished according to the feedback received from the other users of the listing service, and
   wherein the first user of the listing service and a third user of the listing service are associated with one another by virtue of an extended circle, wherein the trust component further determines at least one trust level for the first user of the listing service in association with the third user of the listing service, and wherein the trust level determined for the first user of the listing service in association with the third user of the listing service is lower than the trust level assigned to the first user of the listing service in association with a fourth user of the listing service, the fourth user of the listing service being associated with at least one of the one or more communities of users.

2. The trust-based system of claim 1, further comprising:
   a notification component that notifies the first user of the listing service of any new or modified listings of the second user of the listing service based at least in part on the trust level of the first user of the listing service in association with the second user of the listing service.

3. The trust-based system of claim 2, wherein the notification component sends listing notifications originating from the second user of the listing service to users meeting the threshold level of trust set by the second user of the listing service before sending the listing notifications to users not meeting the threshold level of trust set by the second user of the listing service.

4. The trust-based system of claim 1, further comprising:
   a search component that performs a search request for the first user of the listing service and selectively retrieves the one or more listings of the second user of the listing service in response to the search request based at least in part on the trust level of the first user of the listing service in association with the second user of the listing service.

5. The trust-based system of claim 1, wherein the one or more classified listings of the second user of the listing service comprise content related to at least one of the following: selling an item, requesting an item or service, announcing an available item or service, personal advertising, and job searching.

6. A trust-based system embodied on one or more computer-readable storage media having computer-executable instructions embodied thereon for interacting with a listing service, the trust-based system comprising:
- a user identification component that identifies a user of the listing service and information associated with the user;
- a trust analysis component that determines one or more trust levels associated with the user based on:
  - ranking information associated with the user, and the association of the user with ranking information of one or more communities within the listing service, wherein at least a portion of the information associated with the user is communicated to the trust analysis component from the user identification component;
- a trust-based interaction component that determines which classified listings of the listing service the user is privy to according to the one or more trust levels of the user and only allows communication between the user and other users of the listing service responsive to at least one of the one or more trust levels of the user meeting a threshold level of trust provided by the other users of the listing service; and
- a rating system that rates the user of the listing service based at least in part on feedback received from other users of the listing service, wherein at least one trust level of the user of the listing service is boosted or diminished according to the feedback received from the other users of the listing service,
- wherein the user of the listing service and a second user of the listing service are associated with one another by virtue of an extended circle, wherein the trust component further determines at least one trust level for the user of the listing service in association with the second user of the listing service, and wherein the trust level determined for the user of the listing service in association with the second user of the listing service is lower than the trust level assigned to the user of the listing service in association with a third user of the listing service, the third user of the listing service being associated with at least one of the one or more communities of users.

7. The trust-based system of claim 6, further comprising:
an alert component that sends a notification to the user regarding new or modified listings.

8. The trust-based system of claim 7, wherein the notification comprises a message to the user sent via a communication mode that the user shares with at least a portion of the other users to facilitate minimizing an amount of phishing and spam messages the user receives.

9. The trust-based system of claim 8, wherein the communication mode comprises email messaging and instant messaging systems that the user utilizes or shares with at least some of the other users of the listing service.

10. The trust-based system of claim 7, wherein the notification comprises at least one of a message and a link to one or more of the new or modified listings.

11. The trust-based system of claim 7, wherein the notification appears as an icon or symbol near the name of the user to indicate the user has a new or updated listing.

12. A trust-based method that facilitates interacting with a listing service to post or browse listings, the method comprising:

determining, utilizing a first computing process, at least one trust level for a first user of the listing service based on one or more associations of the first user of the listing service with one or more communities of users within the listing service, each particular community of users possessing a distinct trust level associated with that particular community, wherein the first user of the listing service ceases to be associated with a first community of the one or more communities of users when the first user of the listing service fails to meet a threshold trust level associated with the first community;

utilizing a second computing process, selectively only exposing the first user of the listing service to classified listings of members of a second community of the one or more communities of users responsive to the determined at least one trust level of the first user of the listing service meeting a threshold level of trust determined by the second community, wherein the buyer is a member of the second community; and utilizing a third computing process, rating the first user of the listing service based at least in part on feedback received from other users of the listing service, wherein at least one trust level of the first user of the listing service is boosted or diminished according to the feedback received from the other users of the listing service, wherein the first user of the listing service and a second user of the listing service are associated with one another by virtue of an extended circle, wherein at least one trust level for the first user of the listing service is determined in association with the second user of the listing service, and wherein the trust level determined for the first user of the listing service in association with the second user of the listing service is lower than the trust level assigned to the first user of the listing service in association with a third user of the listing service, the third user of the listing service being associated with at least one of the one or more communities of users, and wherein the first, second and third computing processes are performed by one or more computing devices.

13. The trust-based method of claim 12, further comprising:
performing a search request for the first user of the listing service and retrieving one or more of the listings in response to the search request based at least in part on the trust level of the first user of the listing service.

14. The trust-based method of claim 12, further comprising:
notifying the first user of the listing service of any new or modified listings based at least in part on the trust level of the first user of the listing service.

15. The trust-based method of claim 14, wherein notifying the first user of the listing service comprises appending an icon or symbol near a name of a member of the second community that is associated with at least one of the new or modified listings to indicate-the member has a new or updated listing.

16. The trust-based method of claim 14, wherein notifying the first user of the listing service comprises sending the first user of the listing service a message, the message comprising at least a link to the new or modified listings.

* * * * *